United States Patent
Zhou et al.

(10) Patent No.: US 9,142,330 B2
(45) Date of Patent: Sep. 22, 2015

(54) CONDUCTIVE POLYMER MATERIALS AND PREPARING METHOD AND USES THEREOF

(75) Inventors: Mingjie Zhou, Guangdong (CN); Linglong Zhong, Guangdong (CN); Yaobing Wang, Guangdong (CN)

(73) Assignee: Ocean's King Lighting Science and Technology Co., Ltd., Shenzhen (CN)

( * ) Notice: Subject to any disclaimer, the term of this patent is extended or adjusted under 35 U.S.C. 154(b) by 324 days.

(21) Appl. No.: 13/988,114

(22) PCT Filed: Dec. 30, 2010

(86) PCT No.: PCT/CN2010/080512
§ 371 (c)(1),
(2), (4) Date: Aug. 28, 2013

(87) PCT Pub. No.: WO2012/088691
PCT Pub. Date: Jul. 5, 2012

(65) Prior Publication Data
US 2013/0334467 A1  Dec. 19, 2013

(51) Int. Cl.
| | |
|---|---|
| *H01M 4/13* | (2010.01) |
| *H01M 4/58* | (2010.01) |
| *H01B 1/12* | (2006.01) |
| *H01G 11/36* | (2013.01) |
| *H01G 11/38* | (2013.01) |
| *H01G 11/48* | (2013.01) |
| *H01M 4/60* | (2006.01) |
| *H01M 10/0525* | (2010.01) |

(52) U.S. Cl.
CPC ............... *H01B 1/127* (2013.01); *H01G 11/36* (2013.01); *H01G 11/38* (2013.01); *H01G 11/48* (2013.01); *H01M 4/608* (2013.01); *H01M 10/0525* (2013.01); *Y02E 60/13* (2013.01)

(58) Field of Classification Search
CPC .......... H01G 11/36; H01G 11/38; Y02E 60/13
USPC ...................... 252/502, 511; 429/231.7, 231.8
See application file for complete search history.

(56) References Cited

U.S. PATENT DOCUMENTS

| | | |
|---|---|---|
| 2001/0031900 A1 | 10/2001 | Margrave et al. |
| 2006/0274047 A1 | 12/2006 | Spath et al. |
| 2007/0231696 A1* | 10/2007 | Yazami et al. ............. 429/231.7 |
| 2009/0117467 A1 | 5/2009 | Zhamu et al. |
| 2010/0055458 A1 | 3/2010 | Jang et al. |
| 2011/0223480 A1 | 9/2011 | Wee et al. |

FOREIGN PATENT DOCUMENTS

| | | | |
|---|---|---|---|
| EP | 2 085 357 | 8/2009 | |
| EP | CN 101527202 | * 9/2009 | ............. H01G 11/30 |
| JP | 2005-285440 | * 10/2005 | ............. H01M 4/06 |

(Continued)

*Primary Examiner* — Khanh Tuan Nguyen
(74) *Attorney, Agent, or Firm* — Cesari and McKenna, LLP

(57) ABSTRACT

A conductive polymer material and preparing method and uses thereof are provided. The conductive polymer material comprises conductive polymer and fluorinated graphene doping thereof. The weight ratio of the conductive polymer to the fluorinated graphene is 1:0.05-1. The conductive polymer is one of polythiophene or its derivatives, polypyrrole or its derivatives, and polyaniline or its derivatives. The cycle stability of the conductive polymer material is greatly enhanced for doping of the fluorinated graphene, and the conductive polymer contributes to the good capacitance properties. The preparing method can be operated simply with cheaper cost and lower request for equipments, and is suitable for industrial production.

10 Claims, 1 Drawing Sheet

(56) References Cited

FOREIGN PATENT DOCUMENTS

| WO | WO2009/061685 | 5/2009 |
| WO | WO2009/085015 | 7/2009 |
| WO | WO2009/158117 | 12/2009 |
| WO | WO-2010/027336 | 3/2010 |

* cited by examiner

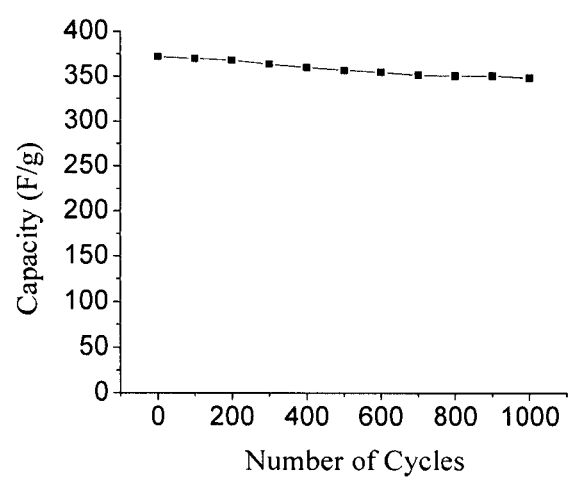

CONDUCTIVE POLYMER MATERIALS AND PREPARING METHOD AND USES THEREOF

CROSS REFERENCE TO RELATED APPLICATION

This application is the national phase under 35 USC 371 of international application no. PCT/CN2010/080512, filed Dec. 30, 2010. The content of the aforementioned application is incorporated herein in its entirety.

TECHNICAL FIELD

The present invention belongs to the technical field of polymer materials, and particularly relates to a conductive polymer material, a method for preparing the same and use of the same.

BACKGROUND ART

Conductive polymers are a series of polymer materials having a conjugated π bond structure in the carbon skeleton. After chemical or electrochemical doping, the conductivity thereof may extend from insulator to the range of conductors. Conductive polymer materials have advantages such as good conductivity, simple preparation process, and long storage time. However, currently used conductive polymer materials have poor cycling stability, and tend to be instable in practice.

SUMMARY OF THE INVENTION

In view of the above, an embodiment of the present invention provides a conductive polymer material to solve the technical problem that the conductive polymer materials of the prior art have poor cycling performance. An embodiment of the present invention further provides a method for preparing a conductive polymer material. An embodiment of the present invention further provides use of the above conductive polymer material in a solar cell, an organic electroluminescent device, or a lithium ion battery.

The present invention is realized as follows.

A conductive polymer material comprises a conductive polymer and a fluorinated graphene doped therein, wherein the mass ratio of the conductive polymer and the fluorinated graphene may be 1:0.05-1, and the conductive polymer may be one of polythiophene or a derivative thereof, polypyrrole or a derivative thereof, and polyaniline or a derivative thereof.

An embodiment of the present invention further provides a method for preparing a conductive polymer material, which comprises the steps of:

dissolving a fluorinated graphene in a surfactant-containing solution to obtain a first solution; and adding an organic monomer into the first solution so that the mass ratio of the organic monomer and the fluorinated graphene may be 1:0.05-1, adding an electrolyte, placing a working electrode and a counter electrode, and electrifying to conduct an electrochemical polymerization to obtain the conductive polymer material, wherein the organic monomer may be one of aniline or a derivative thereof, pyrrole or a derivative thereof and thiophene or a derivative thereof.

An embodiment of the present invention further provides use of the above conductive polymer material in a solar cell, an organic electroluminescent device, or a lithium ion battery.

In the embodiments of the present invention, due to the doping of the fluorinated graphene, the cycling stability of the conductive polymer material is significantly improved. Meanwhile, the conductive polymer results in an excellent capacity performance. The preparation method in the embodiment of the present invention is characterized in simple operation, low costs, and low requirements on the equipments, and is suitable for industrial production.

DESCRIPTION OF THE FIGURES

FIG. 1 shows the cycling life of a conductive polymer material in an embodiment of the present invention in 1 mol/L sulfuric acid.

PREFERRED EMBODIMENTS OF THE PRESENT INVENTION

In order to make the objects, the technical solutions and the advantages of the present invention more apparent, the present invention will be described in further detail below in conjunction with the accompanying drawings and embodiments. It should be understood that the specific embodiments described herein are only for illustrating the present invention but not intended to limit the present invention.

A conductive polymer material comprises a conductive polymer and a fluorinated graphene doped therein, wherein the mass ratio of the conductive polymer and the fluorinated graphene may be 1:0.05-1, and the conductive polymer may be one of polythiophene or a derivative thereof, polypyrrole or a derivative thereof, and polyaniline or a derivative thereof.

The conductive polymer material in the embodiment of the present invention comprises a fluorinated graphene, and one of polythiophene or a derivative thereof, polypyrrole or a derivative thereof, and polyaniline or a derivative thereof. The fluorinated graphene has good cycling stability, and can significantly increase the cycling stability of the conductive polymer material in the embodiment of the present invention, and increase the lifespan thereof. Meanwhile, the above conductive polymer has an excellent capacity performance, so that the conductive polymer in the embodiment of the present invention has a relatively high capacity.

Furthermore, the fluorinated graphene has an excellent conductivity. Due to the doping of the fluorinated graphene, the conductivity of the conductive polymer material in the embodiment of the present invention is significantly improved.

Specifically, the mass ratio of the conductive polymer and the fluorinated graphene may be 1:0.05-1, preferably 1:0.5-1. The fluorinated graphene is doped in the conductive polymer. In some specific embodiments, the long chains of the conductive polymer form a reticulated structure with the fluorinated graphene located therein. In other words, the fluorinated graphene is surrounded by the conductive polymer.

An embodiment of the present invention further provides a method for preparing a conductive polymer material, which comprises the steps of:

S01, preparing a first solution: dissolving a fluorinated graphene in a surfactant-containing solution to obtain the first solution; and S02, preparing the polymer material: adding an organic monomer into the first solution so that the mass ratio of the organic monomer and the fluorinated graphene may be 1:0.05-1, adding an electrolyte, placing a working electrode and a counter electrode, and electrifying to conduct an electrochemical polymerization to obtain the conductive polymer material.

Specifically, in step S01: the surfactant may be an anionic surfactant, a cationic surfactant or a non-ionic surfactant or an amphoteric surfactant. The anionic surfactant may be selected from the group consisting of alkylbenzene sulfonate, aliphatic alcohol sulfate, phosphate, sodium dodecylbenzene sulfonate and sodium toluene sulfonate. The cationic surfactant may be selected from the group consisting of aliphatic amine, amine oxide, quaternary ammonium salt and tetraethylammonium chloride. The non-ionic surfactant may be selected from the group consisting of aliphatic alcohol polyoxyethylene ether, alkylphenol polyoxyethylene ether, carboxylic acid ester and aliphatic alcohol amide. The amphoteric surfactant may be selected from imidazoline.

Furthermore, the concentration of the surfactant in the surfactant-containing solution may be 0.01-0.6 mol/L, and the solvent used may be water or any other solvent. The fluorinated graphene is dissolved in the surfactant-containing solution so that the mass fraction of the fluorinated graphene may be 0.01-0.1%, and then sonicated for 5 minutes to 2 hours, to obtain the first solution. The fluorinated graphene and the surfactant are compatible with each other. Using the surfactant-containing solution as the solvent for the fluorinated graphene may ensure that the fluorinated graphene is completely dissolved and dispersed.

Specifically, there is no limit to the fluorinated graphene used in the preparation method in the embodiment of the present invention, which may be commercially available or may be made by the user. Preferably, a fluorinated graphene may be prepared by the user as follows.

Under a moisture-free and oxygen-free condition, graphene is added into a reactor, to which is charged fluorine gas or a mixed gas of fluorine gas and an inert gas. The materials react at a temperature of 50-500° C. for 3-120 h to give the fluorinated graphene. The inert gas may be nitrogen, helium, argon, neon, or the like. Preferably, a mixed gas of fluorine and nitrogen is charged into the reactor, wherein fluorine gas accounts for 10-30% of the volume of the mixed gas, and nitrogen is used as a diluent gas for fluorine. Most preferably, a mixed gas of fluorine and nitrogen is charged, wherein fluorine gas accounts for 20% of the total volume, and the reaction is carried out at 250° C. for 6 h. There is no limit to the oxygen-free condition, as long as no oxygen is present during the entire reaction process. Preferably, before charging the fluorine gas, the reactor is charged with nitrogen, argon or helium for 0.5-4 hours, followed by charging the above reaction gas under a sealed condition. For achieving the moisture-free condition, graphene is dried before the reaction and dry fluorine gas or mixed gas of fluorine gas and an inert gas is charged at the same time.

Specifically, in step S02, the organic monomer may be thiophene or a derivative thereof, aniline or a derivative thereof, or pyrrole or a derivative thereof. The organic monomer is added into the first solution to give a second solution. In the second solution, the concentration of the organic monomer may be 0.01-0.6 mol/L, and the mass ratio of the organic monomer and the fluorinated graphene may be 1:0.01-1.

An electrolyte is added into the second solution. There is no limit to the electrolyte, as long as it can be dissolved in the second solution and be conductive. Examples thereof include one or more of potassium chloride, sodium chloride, potassium chlorate, potassium perchlorate, sodium bromide, potassium bromide, potassium iodide, sodium iodide, potassium nitrate, sodium nitrate and sodium sulfate. After adding the electrolyte, a third solution is obtained, in which the concentration of the electrolyte may be 0.001-0.3 mol/L.

Then, a working electrode and a counter electrode are placed into the third solution, and a current having a current density of 0.1 to 10 mA/cm$^2$ is applied to the working electrode to conduct an electrochemical polymerization, so that the organic monomer is polymerized under the action of the electric field to produce a long-chain conductive polymer. A great number of the long-chain conductive polymers aggregate to form a reticulated structure or other structure. The reticulated structure further surrounds the fluorinated graphene, and the fluorinated graphene is uniformly doped in the conductive polymer. A uniform composite film, i.e. the conductive polymer material, is formed on the working electrode. By controlling the applied current during the polymerization process, the thickness of the composite film of the polymer material can be controlled.

Further, the working electrode can be used as a substrate for an electrode plate of a supercapacitor, and the working electrode formed with the composite film of the conductive polymer material can be directly used as an electrode of a supercapacitor.

There is no limit to the materials for the working electrode and the counter electrode.

In the embodiments of the present invention, a conductive polymer material is prepared by an electrochemical polymerization, so that a more uniform doping is obtained between the conductive polymer and the fluorinated graphene in the polymer material, which greatly improves the conductivity and the cycling stability of the conductive polymer material.

In the embodiments of the present invention, by doping with the fluorinated graphene, the cycling stability of the conductive polymer material is greatly improved. Meanwhile, the conductive polymer has an excellent capacity performance. The preparation method in the embodiment of the present invention has the advantages of simple operation, low costs, and low requirements on the equipments, and is suitable for industrial production.

An embodiment of the present invention further provides use of the above conductive polymer material in a solar cell, an organic electroluminescent device, or a lithium ion battery.

The preparation method in the embodiments of the present invention will be described in detail by referring to the specific Examples.

EXAMPLE 1

1) Preparation of the Fluorinated Graphene

Graphene is dried in an oven for 24 hours, and then placed into a reactor. Dry nitrogen is charged for 0.5 h, following by charging fluorine gas. The reaction is carried out at 300° C. for 12 h to give the fluorinated graphene.

2) Preparation of the First Solution

The fluorinated graphene is sonicated in a 0.5 mol/L solution containing dodecylbenzene sulfonic acid for 30 min to prepare the first solution in which the mass percentage of the fluorinated graphene is 0.035%.

(3) Preparation of the Conductive Polymer Material

Thiophene monomer is added into the first solution to obtain a second solution, so that the concentration of the thiophene monomer is 0.5 mol/L. Potassium chloride is added into the second solution to obtain a third solution, so that the concentration of potassium chloride is 0.3 mol/L.

A working electrode and a counter electrode are placed into the third solution, and a current having a current density of 10 mA/cm$^2$ is applied to the working electrode to conduct an electrochemical polymerization, to give the conductive polymer material.

The obtained conductive polymer material is sufficiently mixed with a conductive agent and a binder, and then applied on foamed nickel and baked to produce an electrode. Two identical electrodes are assembled into a symmetric type capacitor to carry out a constant-current charge and discharge test, see FIG. 1, which shows the cycling life of the electrode produced from the conductive polymer material prepared in Example 1 of the present invention in 1 mol/L sulfuric acid. The test conditions include: the current density: 0.2 A/g; the range of the cutoff voltage: 0-1 V; and the number of cycles: 1000. As can be seen from FIG. 1, when the initial capacity is 372 F/g, the capacity is retained at 350 F/g after 1000 cycles. The conductive polymer material in this Example of the present invention has an excellent cycling stability.

EXAMPLE 2

1) Preparation of the Fluorinated Graphene

Graphene is dried in an oven for 24 hours, and then placed into a reactor. Dry nitrogen is charged for 0.5 h, following by charging a mixed gas of fluorine and nitrogen in which fluorine accounts for 20% of the total volume. The reaction is carried out at 100° C. for 75 h to give the fluorinated graphene.

2) Preparation of the First Solution

The fluorinated graphene is sonicated in a 0.01 mol/L solution containing dodecylbenzene sulfonic acid for 5 min to prepare the first solution in which the mass percentage of the fluorinated graphene is 0.056%.

3) Preparation of the Conductive Polymer Material

Pyrrole monomer is added into the first solution to obtain a second solution, so that the concentration of the pyrrole monomer is 0.01 mol/L. Potassium nitrate is added into the second solution to obtain a third solution, so that the concentration of potassium nitrate is 0.02 mol/L.

A working electrode and a counter electrode are placed into the third solution, and a current having a current density of 10 mA/cm$^2$ is applied to the working electrode to conduct an electrochemical polymerization, to give the conductive polymer material.

For the method for preparing the electrode, refer to Example 1. When the initial capacity is 352 F/g, the capacity is retained at 320 F/g after 1000 cycles.

EXAMPLE 3

1) Preparation of the Fluorinated Graphene

Graphene is dried in an oven for 24 hours, and then placed into a reactor. Dry nitrogen is charged for 0.5 h, following by charging a mixed gas of fluorine and helium in which fluorine accounts for 30% of the total volume. The reaction is carried out at 250° C. for 86 h to give the fluorinated graphene.

2) Preparation of the First Solution

The fluorinated graphene is sonicated in a 0.25 mol/L solution containing dodecylbenzene sulfonic acid for 110 min to prepare the first solution in which the mass percentage of the fluorinated graphene is 0.025%.

3) Preparation of the Conductive Polymer Material

Aniline monomer is added to the first solution to obtain a second solution, so that the concentration of the aniline monomer is 0.25 mol/L. Potassium chloride is added into the second solution to obtain a third solution, so that the concentration of potassium chloride is 0.1 mol/L.

A working electrode and a counter electrode are placed into the third solution, and a current having a current density of 10 mA/cm$^2$ is applied to the working electrode to conduct an electrochemical polymerization, to give the conductive polymer material.

For the method for preparing the electrode, refer to Example 1. When the initial capacity is 349 F/g, the capacity is retained at 337 F/g after 1000 cycles.

EXAMPLE 4

1) Preparation of the Fluorinated Graphene

Graphene is dried in an oven for 24 hours, and then placed into a reactor. Dry nitrogen is charged for 0.5 h, following by charging a mixed gas of fluorine and helium in which fluorine accounts for 10% of the total volume. The reaction is carried out at 450° C. for 45 h to give the fluorinated graphene.

2) Preparation of the First Solution

The fluorinated graphene is sonicated in a 0.6 mol/L solution containing dodecylbenzene sulfonic acid for 15 min to prepare the first solution in which the mass percentage of the fluorinated graphene is 0.01%.

3) Preparation of the Conductive Polymer Material

Aniline monomer is added to the first solution to obtain a second solution, so that the concentration of the aniline monomer is 0.6 mol/L. Potassium chloride is added into the second solution to obtain a third solution, so that the concentration of potassium chloride is 0.2 mol/L.

A working electrode and a counter electrode are placed into the third solution, and a current having a current density of 10 mA/cm$^2$ is applied to the working electrode to conduct an electrochemical polymerization, to give the conductive polymer material.

For the method for preparing the electrode, refer to Example 1. When the initial capacity is 354 F/g, the capacity is retained at 340 F/g after 1000 cycles.

EXAMPLE 5

1) Preparation of the Fluorinated Graphene

Graphene is dried in an oven for 24 hours, and then placed into a reactor. Dry nitrogen is charged for 0.5 h, following by charging a mixed gas of fluorine and helium in which fluorine accounts for 10% of the total volume. The reaction is carried out at 50° C. for 120 h to give the fluorinated graphene.

2) Preparation of the First Solution

The fluorinated graphene is sonicated in a 0.1 mol/L solution containing dodecylbenzene sulfonic acid for 2 hours to prepare the first solution in which the mass percentage of the fluorinated graphene is 0.1%.

3) Preparation of the Conductive Polymer Material

Aniline monomer is added to the first solution to obtain a second solution, so that the concentration of the aniline monomer is 0.1 mol/L. Potassium chloride is added into the second solution to obtain a third solution, so that the concentration of potassium chloride is 0.025 mol/L.

A working electrode and a counter electrode are placed into the third solution, and a current having a current density of 0.1 mA/cm² is applied to the working electrode to conduct an electrochemical polymerization, to give the conductive polymer material.

For the method for preparing the electrode, refer to Example 1. When the initial capacity is 355 F/g, the capacity is retained at 338 F/g after 1000 cycles.

EXAMPLE 6

1) Preparation of the Fluorinated Graphene

Graphene is dried in an oven for 24 hours, and then placed into a reactor. Dry nitrogen is charged for 0.5 h, following by charging a mixed gas of fluorine and helium in which fluorine accounts for 15% of the total volume. The reaction is carried out at 500° C. for 3 h to give the fluorinated graphene.

2) Preparation of the First Solution

The fluorinated graphene is sonicated in a 0.45 mol/L solution containing dodecylbenzene sulfonic acid for 1 hour to prepare the first solution in which the mass percentage of the fluorinated graphene is 0.06%.

3) Preparation of the Conductive Polymer Material

Aniline monomer is added to the first solution to obtain a second solution, so that the concentration of the aniline monomer is 0.45 mol/L. Potassium chloride is added into the second solution to obtain a third solution, so that the concentration of potassium chloride is 0.3 mol/L.

A working electrode and a counter electrode are placed into the third solution, and a current having a current density of 7 mA/cm² is applied to the working electrode to conduct an electrochemical polymerization, to give the conductive polymer material.

For the method for preparing the electrode, refer to Example 1. When the initial capacity is 375 F/g, the capacity is retained at 359 F/g after 1000 cycles.

EXAMPLE 7

1) Preparation of the Fluorinated Graphene

Graphene is dried in an oven for 24 hours, and then placed into a reactor. Dry nitrogen is charged for 0.5 h, following by charging a mixed gas of fluorine and helium in which fluorine accounts for 17% of the total volume. The reaction is carried out at 150° C. for 65 h to give the fluorinated graphene.

2) Preparation of the First Solution

The fluorinated graphene is sonicated in a 0.035 mol/L solution containing dodecylbenzene sulfonic acid for 15 minutes to prepare the first solution in which the mass percentage of the fluorinated graphene is 0.08%.

3) Preparation of the Conductive Polymer Material

Aniline monomer is added to the first solution to obtain a second solution, so that the concentration of the aniline monomer is 0.035 mol/L. Potassium chloride is added into the second solution to obtain a third solution, so that the concentration of potassium chloride is 0.3 mol/L.

A working electrode and a counter electrode are placed into the third solution, and a current having a current density of 7 mA/cm² is applied to the working electrode to conduct an electrochemical polymerization, to give the conductive polymer material.

For the method for preparing the electrode, refer to Example 1. When the initial capacity is 382 F/g, the capacity is retained at 374 F/g after 1000 cycles.

Described above are merely preferred embodiments of the present invention, and are not intended to limit the present invention. Any modification, equivalent substitution, and improvement, etc., made within the spirit and principle of the present invention should be included in the scope sought protection in the present invention.

The invention claimed is:

1. A conductive polymer material, comprising a conductive polymer and a fluorinated graphene doped therein, wherein the mass ratio of the conductive polymer and the fluorinated graphene is 1:0.05-1, and the conductive polymer is one of polythiophene or a derivative thereof, polypyrrole or a derivative thereof, and polyaniline or a derivative thereof.

2. The conductive polymer material according to claim 1, wherein the mass ratio of the conductive polymer and the fluorinated graphene is 1:0.5-1.

3. A solar cell, an organic electroluminescent device, a lithium ion battery or a supercapacitor, comprising the conductive polymer material according to claim 1.

4. A method for preparing a conductive polymer material, comprising the steps of:
dissolving a fluorinated graphene in a surfactant-containing solution to obtain a first solution; and
adding an organic monomer into the first solution so that the mass ratio of the organic monomer and the fluorinated graphene is 1:0.05-1, adding an electrolyte, placing a working electrode and a counter electrode, and electrifying to conduct an electrochemical polymerization to obtain the conductive polymer material, wherein the organic monomer is one of aniline or a derivative thereof, pyrrole or a derivative thereof and thiophene or a derivative thereof.

5. The method for preparing a conductive polymer material according to claim 4, wherein the method further comprises the following step of preparing the fluorinated graphene:
under a moisture-free and oxygen-free condition, adding graphene into a reactor, charging fluorine gas or a mixed gas of fluorine gas and an inert gas, reacting at a temperature of 50-500° C. for 3-120 h to give the fluorinated graphene.

6. The method for preparing a conductive polymer material according to claim 4, wherein the surfactant is an anionic surfactant, a cationic surfactant, a non-ionic surfactant or an amphoteric surfactant.

7. The method for preparing a conductive polymer material according to claim 6, wherein the working electrode is a substrate for an electrode plate of a supercapacitor.

8. The method for preparing a conductive polymer material according to claim 4, wherein the mass fraction of the fluorinated graphene in the first solution is 0.01-0.1%.

9. The method for preparing a conductive polymer material according to claim 4, wherein, after the organic monomer is added into the first solution, the concentration of the organic monomer is 0.01-0.6 mol/L.

10. The method for preparing a conductive polymer material according to claim 4, wherein the current density applied in the electrochemical polymerization is 0.1 to 10 mA/cm$^2$.

* * * * *